March 15, 1927.　　　　　　　　　　　　　　　　　　1,621,235
H. COLOMB
MANUFACTURING PROCESS OF BLANKS FOR WATCH MOVEMENTS
Filed Oct. 5, 1922
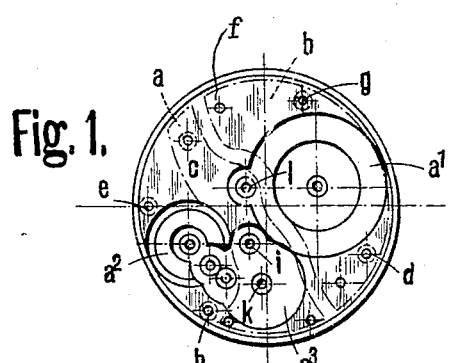
Fig. 1.
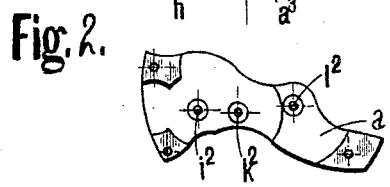
Fig. 2.
Fig. 3.　　　　　Fig. 4.
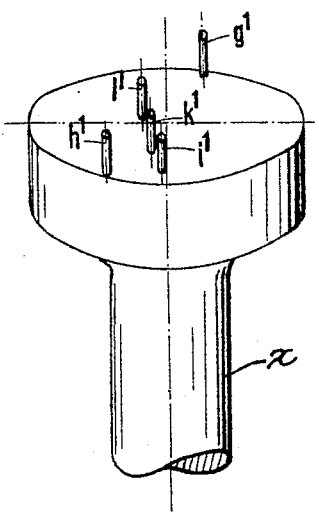 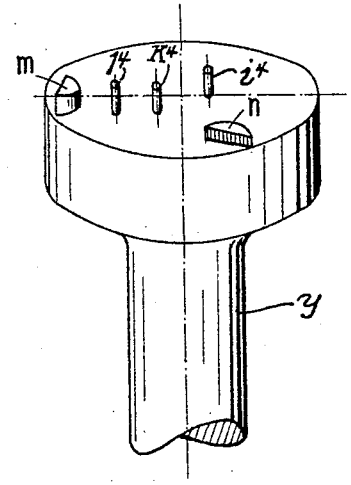
Inventor
H. Colomb
By Marks & Clerk Patented Mar. 15, 1927.

1,621,235

UNITED STATES PATENT OFFICE.

HENRI COLOMB, OF TAVANNES, SWITZERLAND.

MANUFACTURING PROCESS OF BLANKS FOR WATCH MOVEMENTS.

Application filed October 5, 1922, Serial No. 592,641, and in Switzerland March 6, 1922.

The object of the present invention is to provide thorough interchangeability of machined blanks in a complete series of watch movement plates and bridges.

In my copending application Ser. No. 592,642 filed October 5, 1922, I have described a process where all the operations putting great strain on the metal are performed first and then afterwards all holes together to wit, the holes for axle pivots, stone-settings and foot-pins of bridges, are rectified simultaneously by means of a punch and matrix device.

According to the present process the rectifying of the holes of the stone-settings alone or with the holes of the axle-pivots and the rectifying of the holes of the foot-pins of the bridges are effected by separate punching operations at different periods. In this process one of said operations may be performed on the basis of the other when the latter has been completed.

The basis for rectifying may be differently chosen according to need. For instance two additional working holes may be drilled in the plates when it is thought to be the most advisable, that is, when the blank will be subjected no more to any subsequent strain. These working holes are used as guiding marks for all rectifying operations. Also the original working holes after having been rectified with the aid of additional working holes may be used as guide-marks for any of the above mentioned rectifying operations. Furthermore some holes for the stone-settings either alone or with holes for axle pivot or holes for the foot-pins of the bridges may be used as guide-marks for rectifying by a punch and die device the previously drilled holes of plates and bridges.

In the bridges either the screw-holes, or holes of the foot pins or axle-pivot holes, or either one foot-pin hole and an axle-pivot hole combined, or a portion of the periphery of the bridge combined with one foot-pin hole or with one axle-pivot hole may be used as guide marks as it may be found convenient. All the holes which are punched have to be drilled previously.

In the accompanying drawings:

Fig. 1 is a plan view of a plate.

Fig. 2 is a similar view of a bridge-piece, the latter being also indicated in dotted lines in Fig. 1.

Fig. 3 is a perspective view of a tool for rectifying the plate; and

Fig. 4 is a similar view of a tool for rectifying the bridge-piece.

The plate $c$, as illustrated in Fig. 1, is already formed with the recesses $a^1$, $a^2$, $a^3$, the bridges $a$ and $b$ being indicated in dotted lines in the positions they will occupy. For mounting the plate $c$ onto various machines a device having three pintles which correspond with the working holes $d$, $e$, $f$ is provided. The holes are subject to distortion, as previously explained, and after the plate $c$ has been worked, two additional holes $g$, $h$, are formed in the plate, by the intermediary of which the holes $k$, $l$ for adjusting the setting of the stones are rectified. This operation is effected by means of the matrix illustrated in Fig. 3, which has pintles $g^1$, $h^1$ adapted to engage in the holes, $g$, $h$, to provide correct centering, and pintles $i^1$, $k^1$, $l^1$ of shorter length which subsequently enter the holes $i$, $k$, $l$, which are thereby sharpened and rectified.

Fig. 2 is an underside view of the bridge $a$, Fig. 1 having the holes $i^2$, $k^2$, $l^2$ for stone setting which are required to correspond with the holes $i$, $k$, $l$ of the plate $c$. These holes $i^2$ $k^2$ $l^2$ are rectified by the operation of the punch illustrated in Fig. 4 which is centered by lugs $m$, $n$ shaped to fit parts of the outline of the bridge.

It is obvious that, since the holes $i^2$, $k^2$, $l^2$ in bridge $a$ must come opposite holes $i$, $k$, $l$, in plate $c$ when said bridge is turned over so that its face (shown in Fig. 2) will be next to plate $c$, the punch pins $i^4$, $k^4$, $l^4$ of the punch $y$ shown in Fig. 4 for operating on what will be the under face of the bridge $a$ when it is placed on the plate $c$ must be so located as to come opposite to the punch pins $i^1$, $k^1$, $l^1$ on the punch $x$ shown in Fig. 3 which is to operate on the plate. By "opposite" I mean so disposed that if the two punches were placed face to face with their axes in line, pin $i^1$ would be in line with pin $i^4$, $k^1$ with $k^4$ and $l^1$ with $l^4$. Another pair of punches similarly arranged would be provided for rectifying bridge $b$ and the plate holes cooperating therewith, and so on for each bridge employed in a given watch movement.

It is to be understood, of course, that the holes $i$, $k$ and $l$, etc. are all drilled originally to a diameter slightly less than that which they are to have when in the completed watch movement, and that the rectifying punch pins $i^1$, $k^1$, $l^1$, etc. will remove thin shavings from the walls of these smaller drilled holes to produce the finished holes of exact, predetermined diameter and relative location. All this is fully explained in my Patent No. 1,571,756 granted Feb. 2, 1926, on application No. 592,642 to which reference has been made.

The above description obviously sets forth a special modification of the invention described and claimed in my said Patent No. 1,571,756, granted February 2nd, 1926, in that, according to the present invention, each series of steps constituting the process embodying the invention deals only with the rectification of the particular set of holes or recesses existing in a particular bridge and of the corresponding set of holes or recesses existing in the base plate, a similar procedure being followed with every other bridge in that movement. In this way the accurate location of each bridge on the base plate is assured, and also the perfect alignment and spacing apart of the various pairs of holes which are to receive the jewels or plugs serving as journal bearings for the particular shafts or staffs which are to be mounted between that particular bridge and the portion of the base plate covered by it. By this mode of operation the greatest accuracy and consequent perfection of interchangeability can be secured in the manufacture of such watch movements as have so great a number of holes in the plate as to make it impracticable to true them up all at one time by the operation of a single multiple punch.

Having now particularly described my said invention, what I claim is:—

1. A process for making a bridge and plate of a watch movement which consists in first shaping the bridge and plates by forming the necessary recesses and holes therein, and after the metal of the plate and bridge has been distorted by such operation, then rectifying a number of the holes by a single operation of a punch having a plurality of matrices and after this rectifying step then similarly rectifying the remaining holes by a similar punch operation.

2. A process for making the bridge and plate of a watch movement and assembling the same, comprising first treating the plate and bridge to form the necessary gear or wheels recesses and holes for the bearings, then after the distortion of the metal caused by such operations finally rectifying a portion of the holes at a single operation of a die and then using the rectified holes as a guide for rectifying the remaining holes.

3. A process for making bridges and plates and assembling the same in watch movements comprising making the usual foot-holes, gear recesses and pivot bearings in the plates and bridges, then after the metal has been put under stresses and slight deformations by this treatment, rectifying a plurality of the holes in each plate or bridge by a punch having a plurality of matrices to cooperate with previously formed holes and then using these holes as guides for finally completing the rectification of the remaining holes in the plates and bridges and assembling the same into watch movements.

4. A process for making the plate of a watch movement which consists in first forming the plate by cutting the necessary holes therein each of a diameter slightly less than that which it is to finally have, and, after the metal of the plate has been distorted by such operation, rectifying a number of the holes by a single operation of a punch having a plurality of punch pins, each of which has the exact diameter which the hole with which it registers is to have when finished, and, after this rectifying step similarly rectifying the remaining holes by a similar punching operation.

5. A process for making the bridge and plate of a watch movement and assembling the same, comprising first treating the plate and bridge to form the necessary gear or wheel recesses and also holes of slightly less than finished diameters for the bearings, then, after the distortion of the metal caused by such operations, finally rectifying a portion of such holes by a single operation of a multiple punch, and then using certain of the rectified holes as guides for similarly rectifying the remaining holes.

6. A process for making bridges and plates and assembling the same in watch movements, comprising making the usual foot-holes, gear recesses or sinks and roughing out approximately pivot bearings in the plates and bridges, and then, when the metal has assumed its final set after the stresses and slight deformations produced by this treatment, rectifying a plurality of the holes in each plate or bridge by a punch having a plurality of punch pins so located as to cooperate with certain of the previously formed holes and, finally, using certain of these rectified holes as guides for completing similarly the rectification of the remaining holes in the plates and bridges and thereafter assembling the same into watch movements.

In testimony whereof I affix signature.

HENRI COLOMB.